United States Patent [19]

Arkenbout et al.

[11] 4,400,189

[45] Aug. 23, 1983

[54] PULSED CRYSTALLIZATION COLUMN AND METHOD OF COUNTERCURRENT CRYSTALLIZATION

[75] Inventors: Gerardus J. Arkenbout; Albert van Kuijk, both of Zeist; Johannes van der Meer, Loenen a/d Vecht; Leonardus H. J. M. Schneiders, Zeist, all of Netherlands

[73] Assignee: Nederlandse Centrale Organisatie voor Toegepast Natuurwetenschapplijk Onder Zoek, The Hague, Netherlands

[21] Appl. No.: 348,981

[22] Filed: Feb. 16, 1982

Related U.S. Application Data

[63] Continuation-in-part of Ser. No. 158,733, Jun. 12, 1980, abandoned.

[30] Foreign Application Priority Data

Feb. 13, 1980 [NL] Netherlands ............... 8000906

[51] Int. Cl.³ .............................. B01D 9/02
[52] U.S. Cl. ........................ 62/538; 422/251
[58] Field of Search ............ 422/225, 251, 253–255, 422/287; 62/123, 538, 543–545; 23/295 R, 299; 261/81

[56] References Cited

U.S. PATENT DOCUMENTS

| | | | |
|---|---|---|---|
| 1,910,386 | 5/1933 | Garrett .............................. | 261/81 |
| 2,890,962 | 6/1959 | Eddy et al. ...................... | 422/251 |
| 2,895,835 | 7/1959 | Findlay ............................. | 422/251 |
| 2,913,344 | 11/1959 | Stallings, Jr. ................... | 62/541 |
| 3,261,170 | 7/1966 | McCarthy et al. .............. | 422/251 |
| 3,330,535 | 7/1967 | Stengel ............................ | 261/81 |
| 3,392,539 | 7/1968 | Grimmett ........................ | 422/251 |
| 3,501,275 | 3/1970 | Sailer et al. .................... | 422/251 |
| 3,681,932 | 8/1972 | Huber et al. ................... | 422/251 |
| 4,170,881 | 10/1979 | Lang et al. ...................... | 62/538 |
| 4,257,796 | 3/1981 | Arkenbout ...................... | 62/538 |

FOREIGN PATENT DOCUMENTS

| | | | |
|---|---|---|---|
| 2149718 | 3/1973 | France . | |
| 283644 | 9/1962 | Netherlands .................. | 422/254 |

*Primary Examiner*—Hiram H. Bernstein
*Attorney, Agent, or Firm*—Hammond & Littell, Weissenberger and Muserlian

[57] ABSTRACT

In a multistage countercurrent crystallization apparatus for multistage crystallization by adiabatic recrystallization and extractive washing comprising a vertical column containing a feed line, a waste material discharge, a purified product discharge, a crystallization zone or chamber at one end and a melter or dissolver at the other end, said vertical column containing a crystallizing liquid, a number of perforated plates subdividing said column into multistages, substantially spherical bodies contacting said perforated plates of a size larger than said perforations and designed to cooperate with the perforations of said perforated plates while in motion with respect to said perforated plates, means for vibrating said perforated plates whereby said substantially spherical bodies vehemently vibrate against said perforated plates, the improvement consisting essentially of reciprocating means to move said crystallizing liquid slowly and periodically with respect to said perforated plates in said column where said means for vibrating and said reciprocating means are coupled in such a manner that said means for vibrating operates only during the period said reciprocating means moves said crystallizing liquid through said column in the direction towards said melter or dissolver; as well as the method of crystallization employing said column.

11 Claims, 2 Drawing Figures

PULSED CRYSTALLIZATION COLUMN AND METHOD OF COUNTERCURRENT CRYSTALLIZATION

PRIOR APPLICATION

This is a continuation-in-part of our copending patent application Ser. No. 158,733, filed June 12, 1980, now abandoned.

BACKGROUND OF THE INVENTION

The invention relates to a multistage countercurrent crystallization apparatus for multistage crystallization by adiabatic recrystallization and extractive washing, comprising a vertical column, the one end of said column being connected to a crystallizer and the other end thereof to a melter or a dissolver, said column furthermore containing a number of perforated plates, substantially spherical bodies contacting said perforated plates and cooperating with said perforated plates while being capable of moving with respect to said perforated plates, as well as a vibrator for putting the perforated plates into substantial vibration.

In the chemical industry, purification and concentration treatments play an important role. The purity of starting materials is subject to ever increasing purity requirements. In some instances purities of more than 99.99% are required. Among the known methods for purification, mention may be made of distillation, extraction and crystallization.

In principle, the application of crystallization offers a number of advantages for purification with respect to those of distillation, that is, the separating action of the singular process is often larger upon crystallization than upon distillation, the operating temperature is, in general, lower while the energy consumption is less.

Distillation and extraction are utilized on large scale because of the availability of devices and methods by means of which multi-stage separations may be carried out continuously. This is not the case for crystallization on industrial scale.

Organic compounds having a purity, for instance of 80–95%, which may be considered for a final purification will often contain a number (5 to 20 types) of contaminations. In many cases the separation factor for all of these contaminations is so high that only one crystallization suffices for obtaining crystals of the pure main component after a final washing treatment. However, it will then be required that the crystallization occurs at the equilibrium conditions. This is only possible if low crystallization velocities of, for example, 1–5 mm per unit of cooling surface area and per hour are utilized. Furthermore, adsorption of contaminations should not take place on the crystals and no contaminations forming mixed crystals may be present.

For an industrial application it is of importance that the crystallization velocities are high and amount to, for example, 100 mm per unit of cooling surface area per hour because in this way the volume of the installation and, consequently, also the installation costs related to the production output may be kept sufficiently small.

A further troubling factor is that the crystals should preferably be formed at the site having the highest concentration of contaminations (10 to 35% by weight). The higher the concentration of contaminations, the greater the risk of the formation of dendritic crystals and inclusions will be.

Even at crystallization velocities of 10 mm per unit of cooling surface area per hour, kinetic effects will play a dominating role, and such increasingly if the concentration of contaminations is higher. Consequently, no dense crystals of the pure main component will be formed, that could be washed and subsequently filtered or separated easily but only spongy structures having occlusions of many contaminations.

The aim is to obtain large dense crystals. Accordingly, it is necessary to utilize low growing velocities under very carefully selected conditions, thus leading consequently to sizable installations and high installation costs.

The Dutch Patent specification No. 158, 701, corresponding to commonly assigned U.S. patent application Ser. No. 194,945, filed Nov. 2, 1971, now abandoned in favor of its continuation-in-part Ser. No. 606,341, filed Aug. 21, 1975, now abandoned in favor of its continuation-in-part Ser. No. 768,145, filed Feb. 14, 1977, now U.S. Pat. No. 4,257,796, describes a vertically positioned countercurrent crystallization apparatus for multi-stage crystallization comprising a column containing a plurality of horizontal perforated plates positioned in a stacked position at regularly spaced intervals and having at the one end thereof a crystallization zone and at the other end thereof a melting or dissolution zone, said column being constructed mainly as a continuous adiabatic exchange column in which all separations between two successive compartments are of such a type that the passage of liquid as well as of crystals is possible and in which means have been provided for setting a large number of freely resting substantially spherical bodies into such a vehement vibration with respect to the perforated plates that they will regularly leave the perforated plates and return thereto while subjected to accelerating forces of about 2 to 5 times the gravitational force.

The U.S. Pat. No. 3,392,539 discloses a similar column in which by means of a succession of hot and cold zones an intermittent, i.e. not adiabatic, process of recrystallization and redissolution is made possible. Between the successive zones there have been provided only insulating plates passing liquid superimposed at some distance by a perforated plate on which there has been provided a crystal support consisting of several layers of balls. There is no desire to effect a passage of the crystals through these layers of balls. An overflow pipe has been provided for the transfer of these crystals from a cold crystallization zone to a hot dissolving zone arranged therebelow. The substantially saturated solution formed in a dissolving zone is transferred to a cold crystallization zone arranged therebelow via a by-pass provided with a pump. Means may be provided for imparting a pulsation to the mass of the liquid in the column which means may consist of a reciprocating piston in a side tube connected to the bottom of the column.

In accordance with the Swiss Patent specification No. 466,222, corresponding to U.S. Pat. No. 3,501,275, a reciprocating pulsation at the frequency of 5–500 $min^{-1}$ and a stroke preferably of 200 mm (with a column length of 1 m ) is transmitted to the liquid in a column by application of a piston mechanism installed in a side tube. A drawback of this column is that the variable process parameters, such as crystal size, mixing, and density of packing cannot be adequately controlled. Moreover, this column does not provide enough possibilities of preventing crystal masses from adhering to the wall or of breaking up large crystal agglomerates.

OBJECTS OF THE INVENTION

An object of the present invention is to develop an apparatus and process for the countercurrent multistage crystallization by adiabatic recrystallization and extractive washing which does not exhibit the drawbacks of the prior art.

Another object of the present invention is the development, in a multistage countercurrent crystallization apparatus for multistage crystallization by adiabatic recrystallization and extractive washing comprising a vertical column containing a feed line, a waste material discharge, a purified product discharge, a crystallization zone or chamber at one end and a melter or dissolver at the other end, said vertical column containing a crystallizing liquid, a number of perforated plates subdividing said column into multistages, substantially spherical bodies contacting said perforated plates of a size larger than said perforations and designed to cooperate with the perforations of said perforated plates while in motion with respect to said perforated plates, means for vibrating said perforated plates whereby said substantially spherical bodies vehemently vibrate against said perforated plates, the improvement consisting essentially of reciprocating means to move said crystallizing liquid slowly and periodically with respect to said perforated plates in said column where said means for vibrating and said reciprocating means are coupled in such a manner that said means for vibrating operates only during the period said reciprocating means moves said crystallizing liquid through said column in the direction towards said melter or dissolver.

A further object of the present invention is the development, in the process for continuous countercurrent liquid-solids contact for multistage crystallization by adiabatic recrystallization and extractive washing comprising the steps of passing a liquid in essentially one direction through a vertically-aligned confined space in contact with crystals being passed in the other direction, said liquid being a solvent for at least part of said crystals, said confined space being substantially horizontally restricted in a plurality of places, said horizontal restrictions being a plurality of perforated plates positioned at spaced intervals in said vertically aligned confined space-forming compartments, said restrictions being such that the said crystalline solids to be treated in countercurrent with said liquid substantially pass through said perforated plates, providing a drumming action against said perforated plates by means of movable substantially spherical objects being substantially vertically vibrated against said perforated plates at a frequency of between 100 and 10,000 vibrations per minute with amplitudes of between 0.1 and 5 millimeters, whereby the passage of said crystalline solids through the perforations of said perforated plates is substantially promoted, said substantially vertical vibrations of said movable objects being effected by motion of said perforated plates in a vertical oscillation at such a rate that said movable objects are subjected to accelerating forces of about 2 to 5 times the gravitational forces, the improvement consisting of moving said liquid slowly and periodically with respect to said perforated plates, where said liquid movement and said drumming action are coordinated whereby said drumming action occurs only when said liquid is moving through said perforated plates in the direction said crystalline solid is being passed.

These and other objects of the present invention will become more apparent as the description thereof proceeds.

THE DRAWINGS

DESCRIPTION OF THE INVENTION

Figure 1:
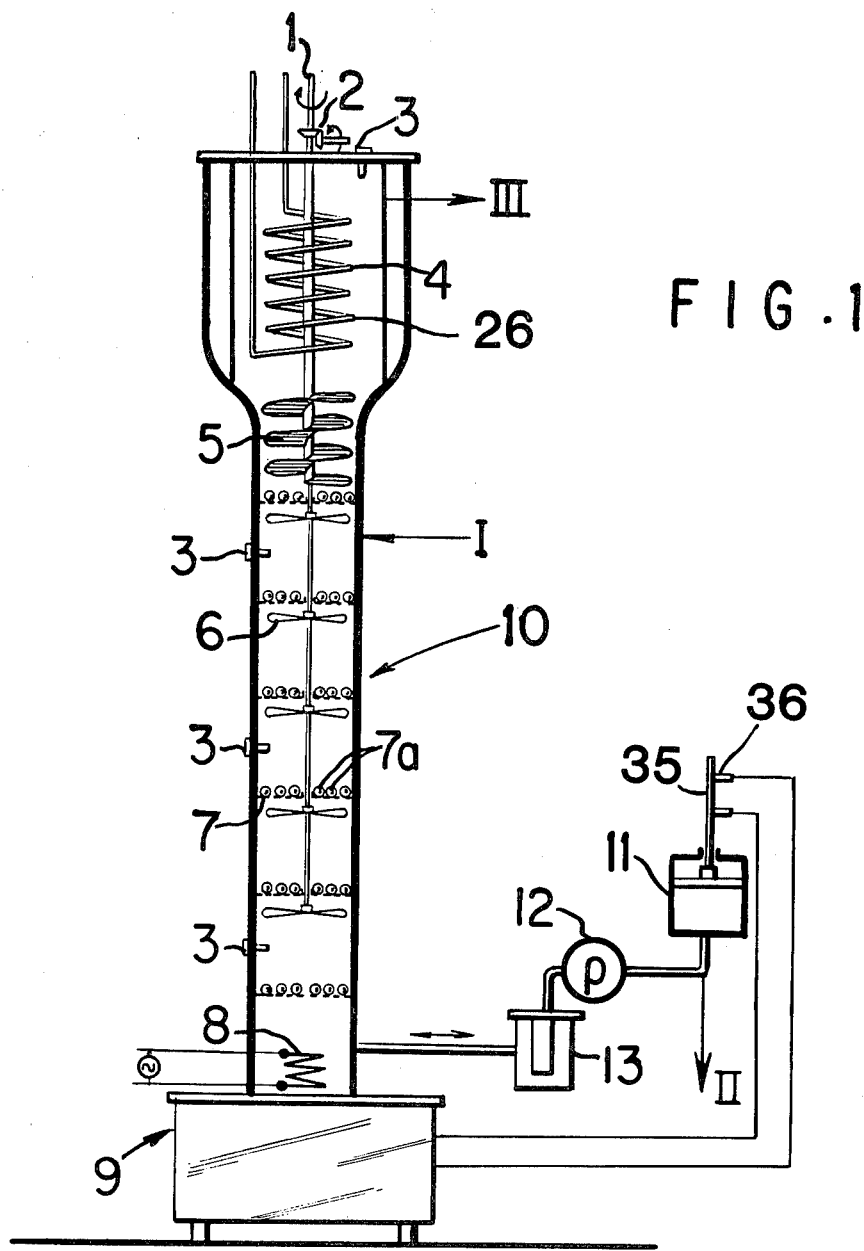
FIG. 1 is a cross-sectional view of one embodiment of the multistage countercurrent crystallization column of the invention where the entire column is vibrated.

The drawbacks of the prior art have been overcome by the present invention which relates to an improvement in a multistage countercurrent crystallization apparatus for multistage crystallization by adiabatic recrystallization and extractive washing comprising a vertical column containing a feed line, a waste material discharge, a purified product discharge, a crystallization zone or chamber at one end and a melter or dissolver at the other end, said vertical column containing a crystallizing liquid, a number of perforated plates subdividing said column into multistages, substantially spherical bodies contacting said perforated plates of a size larger than said perforations and designed to cooperate with the perforations of said perforated plates while in motion with respect to said perforated plates, means for vibrating said perforated plates whereby said substantially spherical bodies vehemently vibrate against said perforated plates.

The inventive column is characterized in that the column has been provided with means for moving the liquid slowly and periodically with respect to the perforated plates by a reciprocating movement through said perforated plates and that said vibrator has been coupled to said means in such a manner that the perforated plates are only put into vibration during the movement of the liquid with respect to the perforated plates in the direction towards the melter or dissolver.

Furthermore, the invention relates to a method for performing a crystallization in such an apparatus, which method is characterized in that for increasing the conveyance of the crystals and for increasing the packing density, the liquid in the column is periodically reciprocatingly moved through the perforated plates and the perforated plates are only put into vibration during the movement of the liquid with respect to the perforated plates in the direction of the melter or dissolver.

More particularly, the process of the invention is related to an improvement in the process for continuous countercurrent liquid-solids contact for multistage crystallization by adiabatic recrystallization and extractive washing comprising the steps of passing a liquid in essentially one direction through a vertically-aligned confined space in contact with crystals being passed in the other direction, said liquid being a solvent for at least part of said crystals, said confined space being substantially horizontally restricted in a plurality of places, said horizontal restrictions being a plurality of perforated plates positioned at spaced intervals in said vertically aligned confined space-forming compartments, said restrictions being such that the said crystalline solids to be treated in countercurrent with said liquid substantially pass through said perforated plates, providing a drumming action against said perforated plates by means of movable substantially spherical objects being substantially vertically vibrated against said perforated plates at a frequency of between 100 and 10,000 vibrations per minute with amplitudes of between 0.1 and 5 millimeters, whereby the passage of said crystalline solids through the perforations of said perforated plates is substantially promoted, said substantially vertical vibrations of said movable objects being effected by motion of said perforated plates in a vertical oscillation at such a rate that said movable objects are subjected to accelerating forces of about 2 to 5 times the gravitational forces, the improvement consisting of moving said liquid slowly and periodically with respect to said perforated plates, where said liquid movement and said drumming action are coordinated whereby said drumming action occurs only when said liquid is moving through said perforated plates in the direction said crystalline solid is being passed.

The provision of optionally movable perforated plates in a column in which a solid (crystals) is contacted in countercurrent with a liquid is known per se from the French Patent specification No. 2,149,718. The purpose of these plates is to decrease the convection in said column. This leads to a decrease of the mixing in longitudinal direction. For quite some time such plates have been used in extraction column for the same purpose. The installation of horizontal perforated plates in a column inhibits, however, the transfer of crystals (see said French specification, page 3, lines 11–18, inclusive). Moreover, it is known from experience that sieve plates, especially wide meshed ones, will suppress the convection only a little whereas they may even promote the convection considerably when they are subject to movement.

Instead of a retardation of the transfer of crystals, an acceleration of the crystal transfer to several times that of the natural sedimentation is often desirable, however. Likewise, a better suppression of the convection is to be desired. The invention presently described is directed to that purpose.

In the development of the present invention, it has become apparent that a mechanical action of balls on the crystals on perforated plates conveyed through a column in countercurrent with a melt will considerably promote the adiabatic recrystallization and the washing of the crystals. In this way contaminations occluded as a result of a rapid crystal growth will be leached out again and dense crystals of high purity (often >99.99%) will be formed.

Very clearly a multistage separation in accordance with the countercurrent principle is concerned in this instance. This principle has also been proved by tests with mixed crystal systems, a purification of which is very difficult in accordance with the presently available methods.

The multistage countercurrent crystallization column according to the invention for a multistage crystallization is provided with a plurality of horizontal perforated plates installed in a stacked arrangement and positioned at regularly spaced intervals and with a large number of substantially spherical bodies resting on these perforated plates. Moreover, this column comprises at the one end thereof a crystallization zone and the other end thereof a melting or dissolving zone. Means have been provided for putting the loosely resting spherical bodies into such a vehement vibration by means of the perforated plates that these bodies will regularly leave the perforated plate and return thereto. Due to the vibration on the perforated plates, these plates offer little resistance to passage by both the liquid and the crystals. The column has been designed such that it functions as a continuous adiabatic exchange column, i.e. without any heat exchange with the surroundings.

A preferred embodiment provides that between the perforated plates in the column, agitators are present which are connected with a driving mechanism and are rotated at a speed of from 2 to 200 rpm.

It is also preferred that at the site of the crystallization zone the column is provided with a conveyor for conveying the crystal mass, said conveyor being present between the crystallizer in the crystallization zone and the uppermost perforated plate. This conveyor may consist of a screw conveyor or of a perforated plate unconnected to the other perforated plates.

When performing the method for the crystallization, it is preferred to employ a periodically reciprocating linear flow rate of the liquid of 0.1 to 50 mm. sec$^{-1}$ and a cycle frequency of from $10^{-1}$min$^{-1}$ to 10 min$^{-1}$. It is also preferred to use agitators rotated at a speed of from 2 to 200 rpm between the perforated plates.

With respect to the mechanism of the multistage crystallizations performed in which a plate efficiency of 50% was obtained, the following may be remarked.

Due to the mechanical action of the balls, the crystals are damaged, plastically deformed and/or severed. As a result thereof, deviations with respect to the equilibrium condition occur due to which crystals will, nevertheless, melt (or dissolve) and occluded contaminations will be transferred to the melt (or the solution) under adiabatic circumstances. At the same time other crystals of higher purity will grow because the column is maintained under adiabatic conditions.

Moreover, the vibrating balls provide for an optimum density of the crystal packing. At too loose a packing, the separating action will be small due to the strong mixing action in longitudinal direction while at too dense a packing, the separating action will be small due to channeling causing an inhomogeneous countercurrent between crystals and liquid.

It has been found that dendritic crystals deposited from an impure mother liquor at high velocities and under not carefully controlled circumstances, for instance, by the application of an ultrasonically vibrated cooling coil, may be purified in the crystallization column according to the invention by adiabatic recrystallization and extractive washing.

It has been found that if in a crystallization column the gravitational force is the sole driving force for the transfer of crystals, the transfer of dendritic crystals in the column will leave much to be desired. Moreover, the dendritic crystals will form spongy masses causing an insufficiently dense packing. The result thereof will be that the mixing in the longitudinal direction remains too large so that the separating action will consequently be too small.

It has been found that in the column, according to the invention, the transfer velocity of the crystals may be increased considerably by the combination of the low frequency pulsation of the liquid and the periodical interruption of the vibration. At the same time the separating action is improved considerably due to the slight expression of, for instance, dendritic crystals so that a better packing of the crystals is obtained and the efficiency of the adiabatic recrystallizations and the extractive washing is increased.

It will be clear that the reciprocating pulsation of the liquid may be realized in quite different ways. The linear flow rate of the liquid may vary from 0.1 to 50 mm/sec. The velocities in the reciprocating movement do not have to be the same. The cycle frequency may be between 10 min$^{-1}$ and 10$^{-1}$ min$^{-1}$.

The desired reciprocating movement of the liquid may be realized by a slow reciprocating movement of the perforated plates or by means of a pump. In case of the slow reciprocating movement of the perforated plates, these plates are set into vibration when the slow movement is in the direction of the crystallizer and are not set into vibration when the movement is in the direction of the melter or dissolver.

Figure 2:
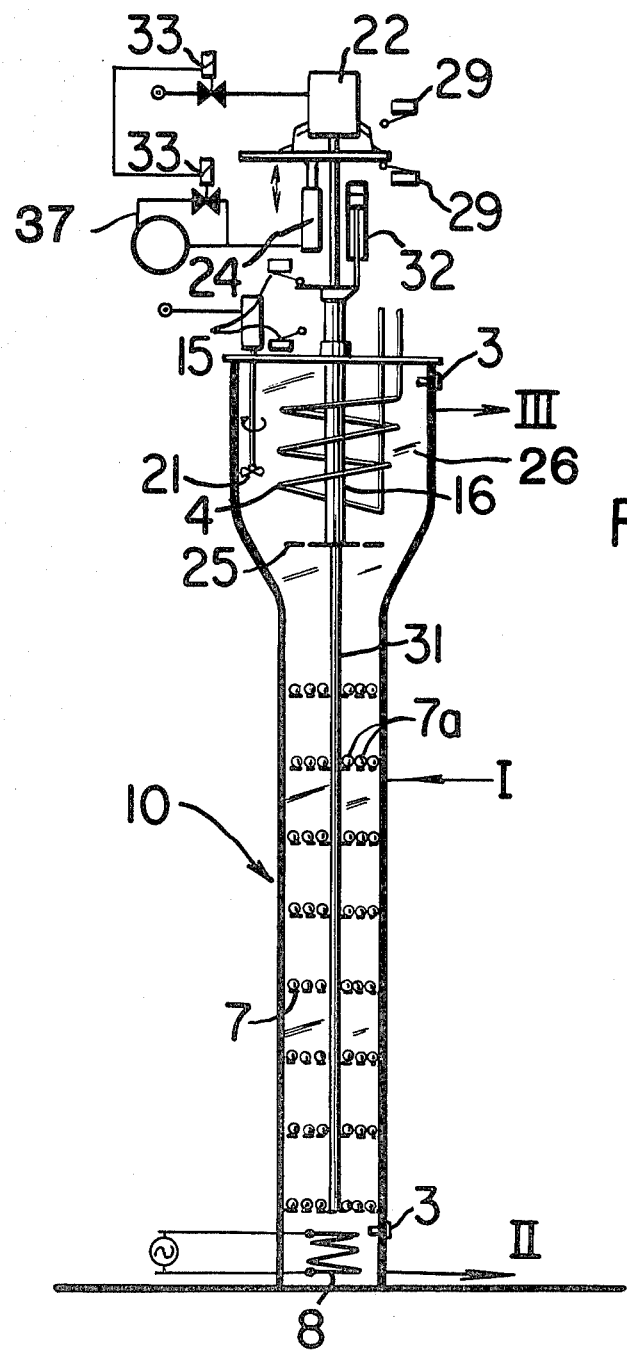
FIG. 2 is a cross-sectional view of another embodiment of the multistage countercurrent crystallization column of the invention where the perforated trays are vibrated.

In the drawings, FIG. 1 is a cross-sectional view of one embodiment of the invention where the entire column is vibrated and FIG. 2 is a cross-sectional view of another embodiment of the invention where the perforated trays are vibrated.

FIG. 1 schematically shows a crystallizer according to the invention employing a combination of conveyance of the liquid up and down by pump and a periodical vibration of the perforated plates. The column (10) has a diameter of 80 mm and contains perforated plates (7) with 2 mm openings. The distance between the perforated plates amounts to 100 mm. Each of the perforated plates (7) contains from 20 to 80 metal balls (7a) with a diameter of 6 to 20 mm. The perforated plates (and the balls) may be put periodically into vibration by means of a vibrator (9) at the frequency of, for instance, 3000 min$^{-1}$ and an amplitude of 0.5 mm. At the top, the column includes a crystallization zone or chamber (26) incorporating a cooling coil (4) made of stainless steel having a surface of 0.08 m$^2$ which is set into vibration at a frequency of 20 kilocycles. At the bottom there has been provided a melt heating device (8). The column is connected to a supply vessel (11) accommodating a level controller (35) via a pump (12) by means of which the liquid may be displaced in two directions through a filter (13). A platinum resistance thermometer is indicated by (3). Furthermore, III indicates the discharge of waste material, I the feed and II the discharge of the purified product. The reference numeral (1) denotes the agitator drive and (2) the screw conveyor drive, while the reference numerals (5) and (6) indicate the screw conveyor (5) and the agitators (6), respectively. Variations in the height of the level controller (35) act on the electrical contacts (36) to control the on-and-off action of the vibrator (9).

In the operation of the crystallizer of FIG. 1, when the liquid in the column is lifted up by the pump (12), the vibration by the vibrator (9) is stopped. The crystals are retained by the perforated plates (7) and are squeezed out. When the liquid is displaced downward by means of the pump (12), the level controller (35) drops and activates the circuit through the electrical contacts (36) causing the vibrator (9) to vibrate and the perforated plates (7) are set into vibration. The crystals will then be passed downward through the perforated plates and will be damaged mechanically under the influence of the balls (7a).

FIG. 2 schematically shows a crystallizer according to the invention, employing a combination of the movement up and down and the periodical vibration of the plates. In FIG. 2 the references (4), (7), (7a), (8), (10), (I), (II) and (III) have the same meaning as in FIG. 1. Moreover, the reference numeral (21) indicates an agitator, (22) a pneumatic vibrator, (3) thermometers, (25) a movable perforated plate unconnected to the other perforated plates, (26) the crystallization chamber, (29) a reversing switch for the hydraulic cylinder (24), (31) the driving rod for the perforated plates (7), (32) the pneumatic cylinder for controlling the movable plate (25), (33) the on/off switch for the vibrator (22) controlled by the reversing switch (29), (15) the reversing switch for the pneumatic cylinder (32) and (16) the driving rod for the perforated plate (25).

Sometimes it may be found to be necessary to promote the transfer of crystals into the direction of the uppermost perforated plate by means of a screw (2,5) as shown in FIG. 1.

Sometimes the packing of the crystals between the perforated plates becomes too dense. In such a case the packing of the crystals between the perforated plates should be kept sufficiently loose by means of a suitable agitator movement (1,6) as indicated in FIG. 1. For this purpose several types of agitators may be used such as rotating impeller agitators or vibrating perforated plate agitators.

The invention will be elucidated in detail with reference to the following examples.

EXAMPLE I

Tests were performed using paraxylene in a column having a diameter of 80 mm which included 5 perforated plates having openings of a diameter of 2 mm. On each of the perforated plates there were about 50 balls having a diameter of 10 mm.

The distance between the plates amounted to 100 mm. The perforated plates were connected to a vibrator by means of a central shaft as shown in FIG. 2.

At the top, the column was connected to a crystallization zone or chamber (26) consisting of a vessel having a content of about 5 liters and a cooling coil having a surface area of 0.08 m$^2$ which was ultrasonically put into vibration at a frequency of 20 kilocycles.

During the tests the crystallization temperature amounted to about 0° C., while in the top part of the column the paraxylene content amounted to 70 mol %. A red dye had been added to the paraxylene mixture. In all instances the test conditions were chosen such that the paraxylene in the lower part of the column would become colorless after some time, this corresponding to a purity of >99.99%.

In a first series of tests the perforated plates were put into a continuous vibration at a frequency of 1500 min$^{-1}$ and an amplitude of 1 mm. Under these circumstances, it was found that the maximum crystal flow at which the paraxylene at the bottom of the column became white and remained white, amounted to 4 kg. hour$^{-1}$.

The higher the transfer velocity of crystals was chosen, the more the density of the packing decreased. At the velocity of more than 4 kg. hour$^{-1}$, the packing became loose whereby the mixing in longitudinal direction increased and the paraxylene at the bottom became red and remained red.

EXAMPLE II

After performing the tests described in Example I, the bottom of the column was connected to a device for imparting a reciprocating displacement to the liquid by pumping, as indicated in FIG. 1 (11, 12, 13, 35, 36).

A test using paraxylene was started, as described in Example I. Contrary to Example I, the liquid in the column was periodically pumped up and down at a frequency of 2 min$^{-1}$ and over a distance of 45 mm. The perforated plates were only put into vibration when the liquid was transported downward. Under these circumstances, crystal packings having a higher density were obtained than in Example I, while higher velocities of crystal transfer were found to be possible.

At a crystal flow of 6 kg. hour$^{-1}$, the supply of crystals to the first perforated plate was found to be insufficient, this being caused also by an unfavorable geometry of the crystallization vessel.

By employing a reciprocating displacement of the liquid in combination with a periodical vibration of the perforated plates, the transfer velocity of crystals was not the limiting factor anymore.

EXAMPLE III

In Example III the arrangement described in Example II was used. For improving the supply of crystals to the uppermost perforated plate, a small screw was provided at the top of the crystallization vessel.

The test conditions were chosen as in Example II. The transfer of crystals to the first perforated plate could be increased by means of the screw. It proved to be possible to effectuate a good purification and a dense packing of crystals at a crystal flow of 8 kg. hour$^{-1}$. The dye borderline was located at the uppermost perforated plate. The entire column per se was white.

The capacity of the crystallization zone or chamber was not sufficient for performing tests at higher transfer rates of crystals.

This example demonstrated that both the purifying efficiency and the crystal transfer could be increased by a combination of a reciprocating displacement of the liquid and a periodical vibration of the perforated plates.

EXAMPLE IV

A crystallization device was made in which the perforated plates could be moved up and down, as shown in FIG. 2. The column included 8 perforated plates having openings of a diameter of 2 mm.

The diameter of the perforated plates amounted to 80 mm while the distance between the perforated plates amounted to 100 mm.

Between the crystallization zone or chamber 26 and the perforated plates, a further perforated plate 25 was provided, which latter plate could be moved up and down by means of the pneumatic cylinder 32 regulated by reversing switch 15 and possessed 2 mm openings (see (25) in FIG. 2).

Tests were performed using paraxylene in a similar way as in the preceding examples.

The column was filled with crystals, the melt heating device 8 was swtiched on and the movement of the plates 7 was started. The plates 7 were moved up and down by means of hydraulic cylinder 24 and reversing switch 29 at a stroke of 50 mm. The direction of the movement was changed twice each minute. When moving upward, the plates were set into vibration by pneumatic vibrator 22 being turned on by the on/off switch 33 activated by pressure in the line 37 from hydraulic cylinder 24, but not during the movement downward when lack of pressure in the line 37 causes on/off switch 33 to turn off the pneumatic vibrator 22.

Without further measures, it proved to be possible to realize a crystal transfer in the column of 8 kg. hour$^{-1}$. A good supply of crystals to the first perforated plate proved to be possible by moving the perforated plate (25) (FIG. 2) up and down by means of pneumatic cylinder 32 and reversing switch 15 at a frequency of 30 min.$^{-1}$ and a stroke of 100 mm.

Due to the downward movement of the perforated plate (25), the crystals were compressed (and squeezed out somewhat) in the direction of the first perforated plate 7. The melt was discharged via the openings running through the plate. During the upward movement a fresh supply of crystal slurry occurred into the chamber below the perforated plate.

The purifying efficiency was very good. The dye front was present above the first perforated plate.

Due to the limited capacity of the crystallization zone or chamber 26, no higher transfer rates of crystals could be investigated in the column.

This example demonstrates that both the purifying efficiency of the column and the crystal transfer may be increased by a combination of a reciprocating movement of the perforated plates and a periodical vibration as described above. A good crystal transfer to the uppermost perforated plate could be effectuated by means of a reciprocating separate perforated plate.

EXAMPLE V

As is well-known, contrary to paraxylene, acetic acid may form spongy crystals easily. In view thereof, yet another series of tests was performed in a device corresponding to the one described in Example I while using acetic acid as the test substance. The column included four perforated plates.

The entire column was put into vibration as in FIG. 1. A screw was provided between the crystallization zone or chamber 26 and the uppermost perforated plate.

When the column was put into a continuous vibration at the frequency of 3000 min$^{-1}$ and an amplitude of 0.5 mm, it was found that a transfer rate of crystals of 1 kg. hour$^{-1}$ could be reached. It was not possible to obtain a dense packing of crystals and to realize a temperature differential between top and bottom. No purification was attained.

EXAMPLE VI

The test in Example V was repeated. In this instance the liquid in the column was, however, displaced up and down over a distance of 30 mm by means of a device as indicated in FIG. 1, in which the pumping direction was changed six times each minute. When displacing the liquid downward, the perforated plates were set into vibration. When the liquid was displaced upward by means of the pump, the plates were not put into vibration. A crystal transfer of 2 kg. hour$^{-1}$ could be obtained by the combination of this reciprocating displacement of the liquid and periodical vibration of the perforated plates. However, the packing of the crystals between the perforated plates became too dense, causing a hold-up of the transfer through the perforated plates for a short time.

EXAMPLE VII

The test described in Example VI was repeated in a modified apparatus. Between the perforated plates, agitating means were provided in a way as indicated in FIG. 1. In this way it proved to be possible to keep the packing of the crystals between the perforated plates sufficiently loose. In this instance a crystal flow at 2 kg. hour$^{-1}$ could be maintained for the duration of the test (one working day).

A temperature differential of 20° C. was effectuated between top and bottom, a convincing indication for a large concentration gradient and a good purification.

The preceding specific embodiments are illustrative of the practice of the invention. It is to be understood, however, that other expedients known to those skilled in the art or disclosed herein, may be employed without departing from the spirit of the invention or the scope of the appended claims.

I claim:

1. In a multistage countercurrent crystallization apparatus for multistage crystallization by adiabatic recrystallization and extractive washing comprising a vertical column containing a feed line, a waste material discharge, a purified product discharge, a crystallization zone or chamber at one end and a melter or dissolver at the other end, said vertical column containing a crystallizing liquid, a number of perforated plates subdividing said column into multistages, substantially spherical bodies contacting said perforated plates of a size larger than said perforations and designed to cooperate with the perforations of said perforated plates while in motion with respect to said perforated plates, means for vibrating said perforated plates whereby said substantially spherical bodies vehemently vibrate against said perforated plates, the improvement consisting essentially of reciprocating means to move said crystallizing liquid slowly and periodically with respect to said perforated plates in said column where said means for vibrating and said reciprocating means are coupled in such a manner that said means for vibrating operates only during the period said reciprocating means moves said crystallizing liquid through said column in the direction towards said melter or dissolver.

2. The crystallization apparatus of claim 1 wherein agitators which are rotated at from 2 to 200 rpm are provided between said perforated plates.

3. The crystallization apparatus of claim 1 or 2 wherein said crystallization zone or chamber is at the top of said column and said column is provided with a conveyor, said conveyor being between said crystallization zone or chamber and the uppermost perforated plate and being adapted to convey crystals to said uppermost perforated plate.

4. The crystallization apparatus of claim 3 wherein said conveyor is a screw conveyor.

5. The crystallization apparatus of claim 3 wherein said conveyor is a perforated plate unconnected to the other perforated plates.

6. The crystallization apparatus of claim 1 or 2 wherein said reciprocating means to move said crystallizing liquid is a pump means external of said column and cooperating therewith.

7. The crystallization apparatus of claims 1 or 2 wherein said reciprocating means to move said crystallizing liquid is an internal means within said column, coupled with said means for vibration, to slowly and periodically move said perforated plates in a reciprocating direction within said column.

8. In the process for continuous countercurrent liquid-solids contact for multistage crystallization by adiabatic recrystallization and extractive washing comprising the steps of passing a liquid in essentially one direction through a vertically-aligned confined space in contact with crystals being passed in the other direction, said liquid being a solvent for at least part of said crystals, said confined space being substantially horizontally restricted in a plurality of places, said horizontal restrictions being a plurality of perforated plates positioned at spaced intervals in said vertically aligned confined space-forming compartments, said restrictions being such that the said crystalline solids to be treated in countercurrent with said liquid substantially pass through said perforated plates, providing a drumming action against said perforated plates by means of movable substantially spherical objects being substantially vertically vibrated against said perforated plates at a frequency of between 100 and 10,000 vibrations per minute with amplitudes of between 0.1 and 5 millimeters, whereby the passage of said crystalline solids through the perforations of said perforated plates is substantially promoted, said substantially vertical vibrations of said movable objects being effected by motion of said perforated plates in a vertical oscillation at such a rate that said movable objects are subjected to accelerating forces of about 2 to 5 times the gravitational forces, the improvement consisting of moving said liquid slowly and periodically with respect to said perforated plates, where said liquid movement and said drumming action are coordinated whereby said drumming action occurs only when said liquid is moving through said perforated plates in the direction said crystalline solid is being passed.

9. The method of claim 8 wherein there is employed a periodically reciprocating linear flow rate of the liquid of from 0.1 to 50 mm/sec and a cycle frequency of from $10^{-1}$ min$^{-1}$ to 10 min$^{-1}$.

10. The method of claim 8 or 9, wherein between said perforated plates said crystals and liquid are agitated at a speed of from 2 to 200 rpm.

11. The method of claim 8, 9 or 10, wherein a cooling and crystallizing zone is provided above the top of said vertically-aligned confined space and said crystals present between the cooling and crystallizing zone and the uppermost perforated plate are conveyed mechanically in the direction away from said cooling and crystallization zone.

* * * * *